(12) United States Patent
Leidefeldt

(10) Patent No.: US 12,447,483 B2
(45) Date of Patent: Oct. 21, 2025

(54) SENSOR CLEANING DEVICE

(71) Applicant: VOLVO TRUCK CORPORATION, Gothenburg (SE)

(72) Inventor: Marcus Leidefeldt, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 620 days.

(21) Appl. No.: 17/755,250

(22) PCT Filed: Oct. 29, 2019

(86) PCT No.: PCT/EP2019/079544
§ 371 (c)(1),
(2) Date: Apr. 25, 2022

(87) PCT Pub. No.: WO2021/083497
PCT Pub. Date: May 6, 2021

(65) Prior Publication Data
US 2022/0362788 A1    Nov. 17, 2022

(51) Int. Cl.
*B05B 7/02*     (2006.01)
*B05B 9/03*     (2006.01)
(Continued)

(52) U.S. Cl.
CPC ............... *B05B 7/025* (2013.01); *B05B 9/03* (2013.01); *B60S 1/54* (2013.01); *B60S 1/56* (2013.01); *G02B 27/0006* (2013.01)

(58) Field of Classification Search
None
See application file for complete search history.

(56) References Cited

U.S. PATENT DOCUMENTS 9,796,361 B2 *  10/2017  Gokan ............... B60S 1/56
2005/0150982 A1 *  7/2005  Lopez ................ B60S 1/52
239/599

(Continued)

FOREIGN PATENT DOCUMENTS

CN    101374708 A    2/2009
JP    H1043642 A     2/1998
(Continued)

OTHER PUBLICATIONS

International Search Report and Written Opinion dated Jul. 9, 2020 in corresponding International PCT Application No. PCT/EP2019/079544, 8 pages.
(Continued)

*Primary Examiner* — Omair Chaudhri
(74) *Attorney, Agent, or Firm* — Venable LLP; Jeffri A. Kaminski

(57) ABSTRACT

The present disclosure relates to a sensor cleaning device (1) for cleaning an external vehicle sensor device from above, the sensor cleaning device comprising, a liquid inlet (10) for receiving pressurized liquid, a first and a second liquid outlet (11, 12) for emitting pressurized liquid which is received from the liquid inlet (10), a chamber (13) for pressurized liquid fluidly connecting the liquid inlet (10) and the first and second liquid outlets (11, 12), wherein each one of the first and second liquid outlets is having a width and a length, wherein the length extends in a length direction (L1, L2) and the width extends in a width direction (w1, w2), wherein the length direction is perpendicular to the width direction, and wherein the first and second liquid outlets (11, 12) are configured so that pressurized liquid is emitted transversely through a sectional plane defined by the width direction and the length direction, wherein, the length is greater than the width for each first and second liquid outlet so that a first and second line-shaped liquid outlet (11, 12) is formed, and the (Continued)

first and second line-shaped liquid outlets (11, 12) are further configured so that emitted pressurized liquid therefrom during use impinge each other, thereby forming a resulting sheet of liquid (LS).

22 Claims, 7 Drawing Sheets

(51) Int. Cl.
    *B60S 1/54*     (2006.01)
    *B60S 1/56*     (2006.01)
    *G02B 27/00*     (2006.01)

(56) References Cited

U.S. PATENT DOCUMENTS

| | | | | |
|---|---|---|---|---|
| 2007/0018013 | A1* | 1/2007 | Lasebnick | B60S 1/52 264/318 |
| 2012/0117745 | A1* | 5/2012 | Hattori | B60S 1/54 134/198 |
| 2013/0092758 | A1* | 4/2013 | Tanaka | B60S 1/52 239/284.1 |
| 2016/0001330 | A1 | 1/2016 | Romack et al. | |
| 2017/0036647 | A1* | 2/2017 | Zhao | B08B 3/02 |
| 2017/0313288 | A1* | 11/2017 | Tippy | B60S 1/566 |
| 2018/0015908 | A1* | 1/2018 | Rice | B60S 1/56 |
| 2018/0079392 | A1* | 3/2018 | Karasik | B60S 1/52 |
| 2018/0134258 | A1* | 5/2018 | Ekola | B60S 1/52 |
| 2019/0184942 | A1* | 6/2019 | Vaishnav | G05D 1/0088 |
| 2019/0232315 | A1 | 8/2019 | Mousavi Ehteshami et al. | |
| 2019/0314685 | A1* | 10/2019 | Hurwitz | B32B 27/32 |
| 2020/0001832 | A1* | 1/2020 | Deane | B08B 3/02 |
| 2020/0061643 | A1* | 2/2020 | Rachow | B05B 7/0892 |
| 2020/0216034 | A1* | 7/2020 | Velasco | B60S 1/528 |
| 2020/0238955 | A1* | 7/2020 | Walsøe | G02B 27/0006 |
| 2020/0307524 | A1* | 10/2020 | Morita | B05B 1/323 |
| 2020/0398795 | A1* | 12/2020 | Sykula | G02B 27/0006 |
| 2021/0061237 | A1* | 3/2021 | Krishnan | G01S 7/4813 |
| 2021/0387597 | A1* | 12/2021 | Trebouet | B08B 13/00 |
| 2022/0032878 | A1* | 2/2022 | Shawgo | B60S 1/54 |
| 2022/0097084 | A1* | 3/2022 | Hayashi | B60S 1/52 |

FOREIGN PATENT DOCUMENTS

| | | | | |
|---|---|---|---|---|
| JP | 2012035654 | A | * 2/2012 | B60S 1/52 |
| JP | 2017193323 | A | 10/2017 | |
| JP | 2019112055 | A | 7/2019 | |
| JP | 2020157897 | A | 10/2020 | |
| WO | 2017080614 | A1 | 5/2017 | |
| WO | 2019042547 | A1 | 3/2019 | |

OTHER PUBLICATIONS

Japanese Office Action dated Oct. 12, 2023 in corresponding Japanese Patent Application No. 2022-523195, 10 pages.
Chinese Office Action dated Mar. 26, 2025 in corresponding Chinese Patent Application No. 201980101815.X, 37 pages.

* cited by examiner

SENSOR CLEANING DEVICE

CROSS-REFERENCE TO RELATED APPLICATIONS

This application is a U.S. National Stage application of PCT/EP2019/079544, filed Oct. 29, 2019 and published on May 6, 2021, as WO 2021/083497 A1, all of which is hereby incorporated by reference in its entirety.

TECHNICAL FIELD

The invention relates to a sensor cleaning device, an external vehicle sensor assembly, a vehicle and/or to a method for cleaning an external vehicle sensor device.

The invention can be applied in heavy-duty vehicles, such as trucks, buses and construction equipment. Although the invention will be described with respect to an autonomous heavy-duty truck, the invention is not restricted to this particular vehicle, but may also be used in other vehicles such as light-weight trucks, articulated haulers, excavators, wheel loaders and backhoe loaders.

BACKGROUND

Autonomous vehicles have the potential to increase productivity and flexibility in a sustainable manner by simultaneously optimizing traffic management and energy efficiency. Autonomous vehicles may be classified based on their level of automation, from level 0 to level 5. For example, a fully automated commercial vehicle which is adapted for performing transport assignments within a limited area, such as a mining area, may have an automation level 4 where no driver attention is required.

Both Advanced Driver Assistance Systems (ADAS) and Autonomous Driving (AD) require perception sensors as input for the automation system. A range of different sensor technologies is used to collect needed data, such as cameras, RaDAR and LiDAR. Light Detection and Ranging (LiDAR) is a system that uses active remote sensing to perceive and map its surroundings. The light that is generated and emitted as pulses is in the form of light amplified by stimulated emission of radiation (laser). The emitted laser pulse reflects on a surface and the time it takes until the laser pulse returns to the LiDAR is registered. There are a few different ways of measuring the distance to the objects on which the light is reflected. Time-of-flight refers to the most common technique where the time for the laser pulse to reach the object, reflect and return is measured. The distance to the surface can thereafter be calculated with the knowledge that the laser pulse travels at the speed of light. From the collected data the computer on board of the vehicle may build an image of the surroundings.

Autonomous vehicles often use a multitude of sensors with different functions to perceive and react to the surrounding environment. Regardless of the sensor type, when installed on the vehicle it will be affected by the surrounding environment. To ensure the required level of performance from the vehicle, the sensors need to function properly during use. A major contributor to the deterioration of the function of the sensor, followed by a decrease in the sensor's performance, is external factors such as dirt and/or rain- or snowfall. These external factors can either obscure sensors' intended field of view or inhibit signal inputs and/or outputs needed for the sensor to function satisfyingly. To reach desired levels of automation the system needs to have the capability to manage the disturbing external factors and re-establish working conditions that enable desired system performance.

The patent application WO 2019/042547 A1 discloses a sensor mounting device for mounting a sensor to an object, e.g. a vehicle. The sensor mounting device comprises a cleaning device for cleaning the sensor with at least one cleaning fluid. The disclosure suggests providing a fluid channel which is integrated in an object attachment member, wherein the fluid channel extends in a circumferential direction around a longitudinal direction of the sensor mounting device. The fluid channel is covered by a lid and the lid comprises one or more fluid outlets which are arranged for allowing fluid to exit the channel for cleaning the sensor.

Even though the above mentioned patent application shows a design for cleaning a sensor, there is still a strive towards developing further improved sensor cleaning devices, especially for perception sensors used on fully or semi-autonomous vehicles.

SUMMARY

In view of the above, an object of the invention is to provide an improved sensor cleaning device, an improved external vehicle sensor assembly, an improved vehicle and/or an improved method for cleaning an external vehicle sensor device, which at least in some aspect alleviates at least one of the drawbacks of the prior art, and/or to at least provide a useful alternative.

According to a first aspect of the invention, the object is achieved by a sensor cleaning device according to claim 1. According to a second aspect of the invention, the object is achieved by an external vehicle sensor assembly according to claim 14. According to a third aspect of the invention, the object is achieved by a vehicle according to claim 19. According to a fourth aspect, the object is achieved by a method according to claim 20.

According to the first aspect thereof, the object is achieved by a sensor cleaning device for cleaning an external vehicle sensor device from above, the sensor cleaning device comprising, a liquid inlet for receiving pressurized liquid,
a first and a second liquid outlet for emitting pressurized liquid which is received from the liquid inlet,
a chamber for pressurized liquid fluidly connecting the liquid inlet and the first and second liquid outlets,
wherein each one of the first and second liquid outlets is having a width and a length,
wherein the length extends in a length direction and the width extends in a width direction,
wherein the length direction is perpendicular to the width direction, and wherein the first and second liquid outlets are configured so that pressurized liquid is emitted transversely through a sectional plane defined by the width direction and the length direction, wherein, the length is greater than the width for each first and second liquid outlet so that a first and second line-shaped liquid outlet is formed, and
the first and second line-shaped liquid outlets are further configured so that emitted pressurized liquid therefrom during use impinge each other, thereby forming a resulting sheet of liquid.

By the provision of the sensor cleaning device as disclosed herein, improved cleaning of an external vehicle sensor can be achieved. More specifically, the inventor has realized that especially in harsh conditions, such as when driving in a mining area where there is plenty of dirt, gravel, mud etc., it may not be sufficient and/or cost efficient to provide a sensor cleaning device which comprises one or more conventional spray nozzles for cleaning the external vehicle sensor. A reason is that it has been found that in order to cover the entire area to be cleaned; many spray nozzles may be required, thus adding cost. Another reason is that not all dirt may be removed when using conventional spray nozzles since the directed liquid sprays may miss certain areas which should be cleaned. Even though the pressurized liquid from the conventional spray nozzles may hit the surface to be cleaned with a high impact force, the liquid may "jump off" the surface and thereby miss other areas thereon which needs to be cleaned. The present invention provides an improved cleaning of the external vehicle sensor in that it has two liquid outlets which are line-shaped and configured so that emitted pressurized liquid therefrom during use impinge each other, and thereby a resulting sheet of liquid can be formed to clean the sensor. By directing a sheet of liquid towards the external vehicle sensor, the entire, or at least almost the entire, surface to be cleaned may be exposed by the cleaning liquid. Consequently, no, or almost no, portion of the surface to be cleaned will be missed when cleaning the external vehicle sensor. Thereby improved cleaning of the external vehicle sensor may be accomplished. Moreover, by providing a first and a second line-shaped liquid outlet as disclosed herein, it has been found that a more cost-efficient sensor cleaning device may be achieved. More specifically, there is no need of any expensive spray nozzles, but rather the line-shaped liquid outlets may for example be produced by more cost-efficient techniques, such as by 3D-printing the sensor cleaning device, or at least parts thereof.

The term "impinge" as used herein means that the emitted pressurized liquids collide or hit each other when and/or after emitted from the line-shaped liquid outlets.

The term "sheet of liquid" as used herein means a flow of liquid which is not beam-like, such as a beam and/or spray emitted from a conventional spray nozzle. Rather, the sheet of liquid may extend over a distance which is perpendicular to a flow direction of the emitted pressurized liquid. The distance may at the outlets be equal to, or essentially equal to, the length of the first and second line-shaped liquid outlets.

Optionally, the first and second line-shaped liquid outlets may further be configured so that during use outlet flow directions of emitted pressurized liquid from each one of the first and second line-shaped liquid outlets are angled relative each other at an angle of 30-120 degrees, such as 50-110, 80-100 or 85-95 degrees. Such impinging angles have shown to provide a uniform and reliable resulting sheet of liquid.

Optionally, the length of the first and/or second line-shaped liquid outlets may be at least 5, 10, 15, 20, 50, 100 or more times greater than the width.

Optionally, each one of the first and second line-shaped liquid outlets may extend in its length direction so that a continuous uninterrupted liquid outlet is formed. No interruptions along the extension of the line-shaped liquid outlets may reduce the risk that any portion of the surface to be cleaned is missed.

Optionally, the first and second line-shaped liquid outlets may further be provided parallel with respect to their length directions. Thereby the resulting sheet of liquid may be similarly shaped along the length of the line-shaped liquid outlets, which may provide more reliable cleaning of the surface to be cleaned.

Optionally, each one of the first and second line-shaped liquid outlets may have a curvature shape with a radius extending from a center axis of the sensor cleaning device to the respective first and second line-shaped liquid outlet. The curvature shape may be annular, such as circular with respect to the center axis. Preferably, the line-shaped liquid outlets may have a curvature shape which essentially follows a curvature shape of the surface to be cleaned.

Optionally, the sensor cleaning device may be formed so that the chamber comprises one or more separate channels formed as respective radially extending arms extending from a center region of the sensor cleaning device to the first and second line-shaped liquid outlets. Providing such separate channels may facilitate manufacturing of the sensor cleaning device, thereby reducing cost. Further, such separate channels may also ensure that a substantially uniform pressure of the liquid is provided during use along the line-shaped liquid outlets, thereby achieving reliable cleaning.

Optionally, the sensor cleaning device may further comprise a gas inlet for receiving pressurized gas and at least one gas outlet for emitting pressurized gas which is received from the gas inlet. The gas used is preferably air. Still optionally, the at least one gas outlet may be provided in-between the first and second line-shaped liquid outlets. A gas outlet may be used for drying the external vehicle sensor device after it has been subjected to cleaning liquid. Further, providing the at least one gas outlet in-between the first and second line-shaped liquid outlets may allow using the at least one gas outlet for providing liquid flows which are different from the resulting sheet of liquid. Thereby different cleaning patterns may be provided, which in turn may improve the cleaning.

Optionally, the at least one gas outlet may have a width and a length, wherein the length extends in a length direction and the width extends in a width direction, wherein the length direction is perpendicular to the width direction, and wherein the at least one gas outlet is configured so that pressurized gas is emitted transversely through a sectional plane defined by the width direction and the length direction. Further, the length is greater than the width so that a line-shaped gas outlet is formed. Preferably, the length direction of the at least one line-shaped gas outlet may be provided parallel with respect to the length direction of at least one of the first and second line-shaped liquid outlets.

Optionally, the sensor cleaning device may further comprise a valve for opening and closing fluid communication from an external source of pressurized gas to the gas inlet.

Optionally, the first line-shaped liquid outlet may be provided closer to a center axis of the sensor cleaning device than the second line-shaped liquid outlet, wherein a first volume of the chamber, which is fluidly connected to and provided proximate the first line-shaped liquid outlet, is smaller than a second volume of the chamber which is fluidly connected to and provided proximate the second line-shaped liquid outlet. Such configuration may enable that liquid is emitted from the first line-shaped liquid outlet before liquid is emitted from the second line-shaped liquid outlet after pressurized liquid has been provided to the liquid inlet. Thereby, at initiation of providing pressurized liquid to the liquid inlet, the above configuration may lead to that liquid is emitted from the first line-shaped liquid outlet without impinging any other pressurized liquid. It has been found that this emission of liquid, without impinging any other emission, may be used for providing a liquid shield, for example when an external moving object is passing by the external vehicle sensor device.

Optionally, the sensor cleaning device may further comprise a valve for opening and closing fluid communication from an external source of pressurized liquid to the liquid inlet.

According to the second aspect thereof, the object is achieved by an external vehicle sensor assembly comprising a sensor cleaning device according to any one of the embodiments of the first aspect of the invention and an external vehicle sensor device.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

Optionally, the sensor cleaning device may be provided as a separate component connected to the external vehicle sensor device. Thus, the sensor cleaning device may be more easily exchanged if required. Further, manufacturing may be facilitated by not integrating the sensor cleaning device with the external vehicle sensor device. According to another embodiment, the sensor cleaning device is integrated with the external vehicle sensor device.

Optionally, the external vehicle sensor device may be any one of a LiDAR sensor, RADAR (RAdio Detection And Ranging) sensor, camera sensor, SoNaR (SOund NAvigation Ranging) sensor or the like.

Optionally, the sensor cleaning device may be provided above the external vehicle sensor device so that the sensor cleaning device can clean an outer peripheral surface of the external vehicle sensor device from a top portion to a bottom thereof, as seen when the external vehicle sensor assembly is mounted to a vehicle.

Optionally, the first and second liquid outlets may further be configured so that the resulting sheet of liquid is directed towards the outer peripheral surface of the external vehicle sensor.

Optionally, the first line-shaped liquid outlet may be configured so that during use an outlet flow direction of emitted pressurized liquid therefrom is directed away from the outer peripheral surface of the external vehicle sensor device, and the second liquid outlet is configured so that during use an outlet flow direction of emitted pressurized liquid therefrom is directed towards the outer peripheral surface of the external vehicle sensor device.

According to the third aspect thereof, the object is achieved by a vehicle comprising the sensor cleaning device according to any one of the embodiments of the first aspect of the invention and/or the external vehicle sensor assembly according to any one of the embodiments of the second aspect of the invention.

Advantages and effects provided by the third aspect of the invention are largely analogous to the advantages and effects provided by the first and second aspects of the invention. It shall also be noted that all embodiments of the third aspect of the invention are applicable to and combinable with all embodiments of the first and second aspects of the invention and vice versa.

According to the fourth aspect thereof, the object is achieved by a method for cleaning an external vehicle sensor device from above by use of a sensor cleaning device according to any of the embodiments of the first aspect of the invention. The method comprises:

providing pressurized liquid to the liquid inlet for a period of time so that the resulting sheet of liquid cleans an outer peripheral surface of the external vehicle sensor device, preferably by opening the valve for the liquid inlet as mentioned in the above, stopping the providing of pressurized liquid to the liquid inlet when the period of time has lapsed, preferably by closing the valve.

Advantages and effects provided by the fourth aspect of the invention are largely analogous to the advantages and effects provided by the first, second and third aspects of the invention. It shall also be noted that all embodiments of the fourth aspect of the invention are applicable to and combinable with all embodiments of the first, second and third aspects of the invention and vice versa.

Optionally, the period of time may be a predetermined period of time. Thereby an automated cleaning procedure may be achieved.

Optionally, when the sensor cleaning device comprises a gas inlet for receiving pressurized gas and at least one gas outlet for emitting pressurized gas, the method may further comprise a step of providing pressurized gas to the gas inlet subsequent to stopping the providing of pressurized liquid to the liquid inlet, preferably by opening the valve for the gas inlet as mentioned in the above.

Still optionally, the method may further comprise a step of simultaneously providing pressurized gas to the gas inlet and pressurized liquid to the liquid inlet. Thereby the speed of emitted pressurized liquid may be increased, which may be beneficial for providing an alternative cleaning which may remove other dirt, particles etc. which cannot be removed by use of the resulting sheet of liquid.

Optionally, the method may further comprise steps of identifying when an external moving object is passing by the external vehicle sensor device, and in response thereto, providing pressurized liquid to the liquid inlet for a predetermined period of time. Thereby a liquid shield of liquid may be provided, as mentioned in the above.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted

DETAILED DESCRIPTION OF EXAMPLE EMBODIMENTS OF THE INVENTION

Figure 1:
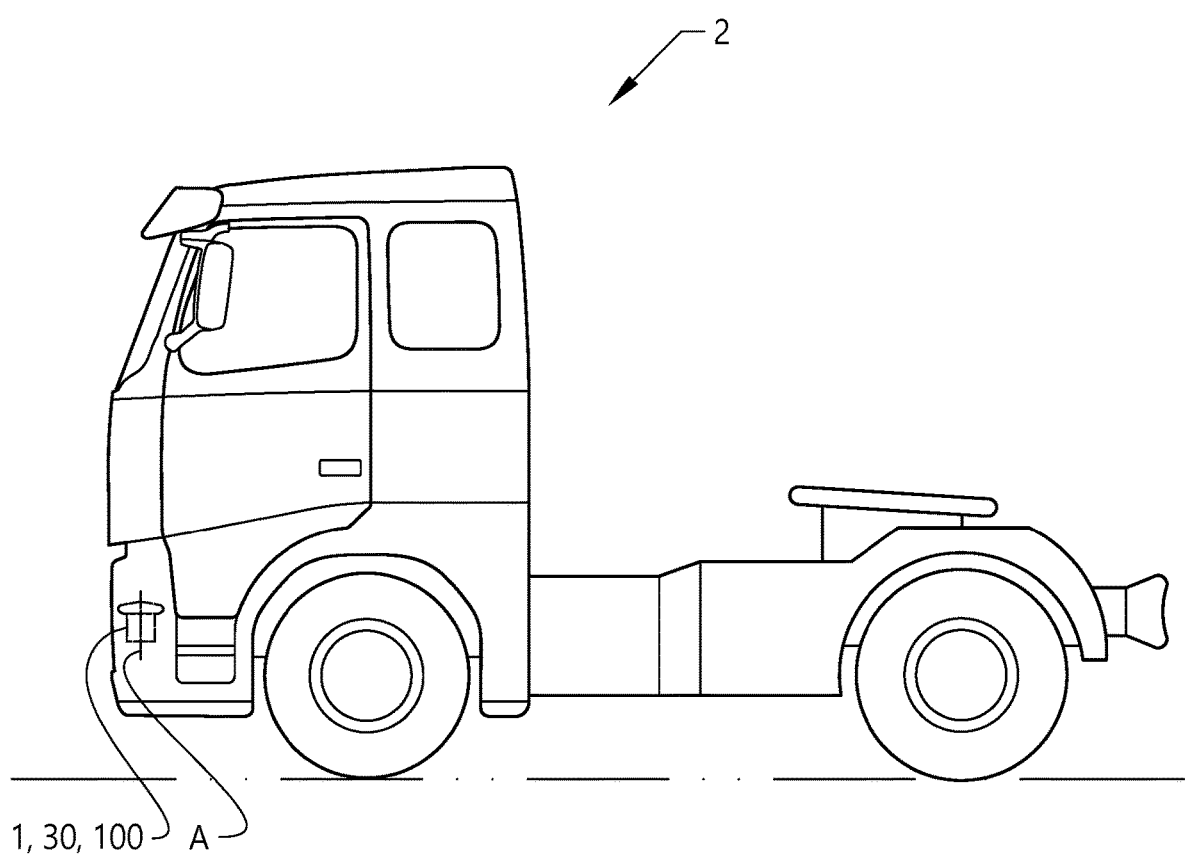
FIG. 1 shows a vehicle according to an embodiment of the present invention.
Figure 2:
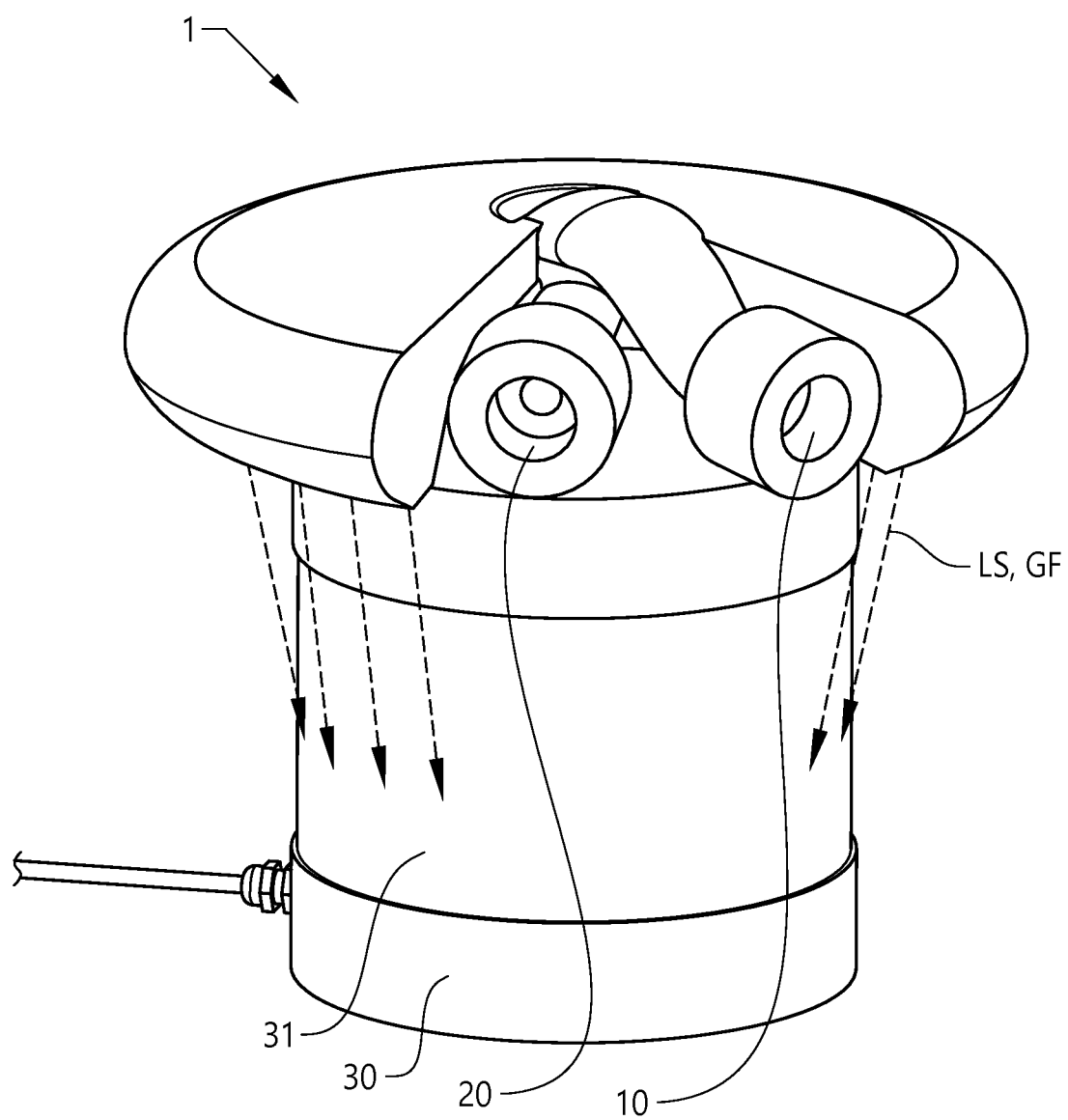
FIG. 2 shows a perspective view of a sensor cleaning device and an external vehicle sensor assembly according to embodiments of the present invention.

FIG. 1 shows a vehicle 2 comprising an external vehicle sensor assembly 100 which comprises a sensor cleaning device 1 according to embodiments of the present invention. The vehicle 2 is here a truck, or more specifically a heavy-duty truck which is configured to be driven autonomously. The external vehicle sensor assembly 100 comprises an external vehicle sensor device 30 which in this embodiment is a perception sensor, such as a LiDAR sensor, used for providing input about the surroundings of the vehicle 2 for controlling the autonomous driving. Only one external vehicle sensor assembly 100 is shown in FIG. 1. It shall however be noted that preferably more than one external vehicle sensor assembly 100 is mounted to the vehicle 100, such as two in the front and two in the back. Even though an autonomous truck is shown, it shall be noted that the present invention is applicable also to other vehicles, such as non-autonomous or semi-autonomous vehicles where parts of the driving is controlled without any human input.

Now, with respect to especially FIGS. 2-6, embodiments of the present invention will be described in more detail. More specifically, a sensor cleaning device 1 for cleaning an external vehicle sensor device 30 from above is shown. The sensor cleaning device 1 comprises a liquid inlet 10 for receiving pressurized liquid and a first and a second liquid outlet 11, 12 for emitting pressurized liquid which is received from the liquid inlet 10. The sensor cleaning device 1 further comprises a chamber 13 for pressurized liquid fluidly connecting the liquid inlet 10 and the first and second liquid outlets 11, 12, see e.g. FIGS. 3 and 4a which show sectional views of the external vehicle sensor assembly 100 and the sensor cleaning device 1. The sectional views are sectional planes defined by a longitudinally extending center axis A of the external vehicle sensor assembly 100 and the sensor cleaning device 1.

Figure 5:
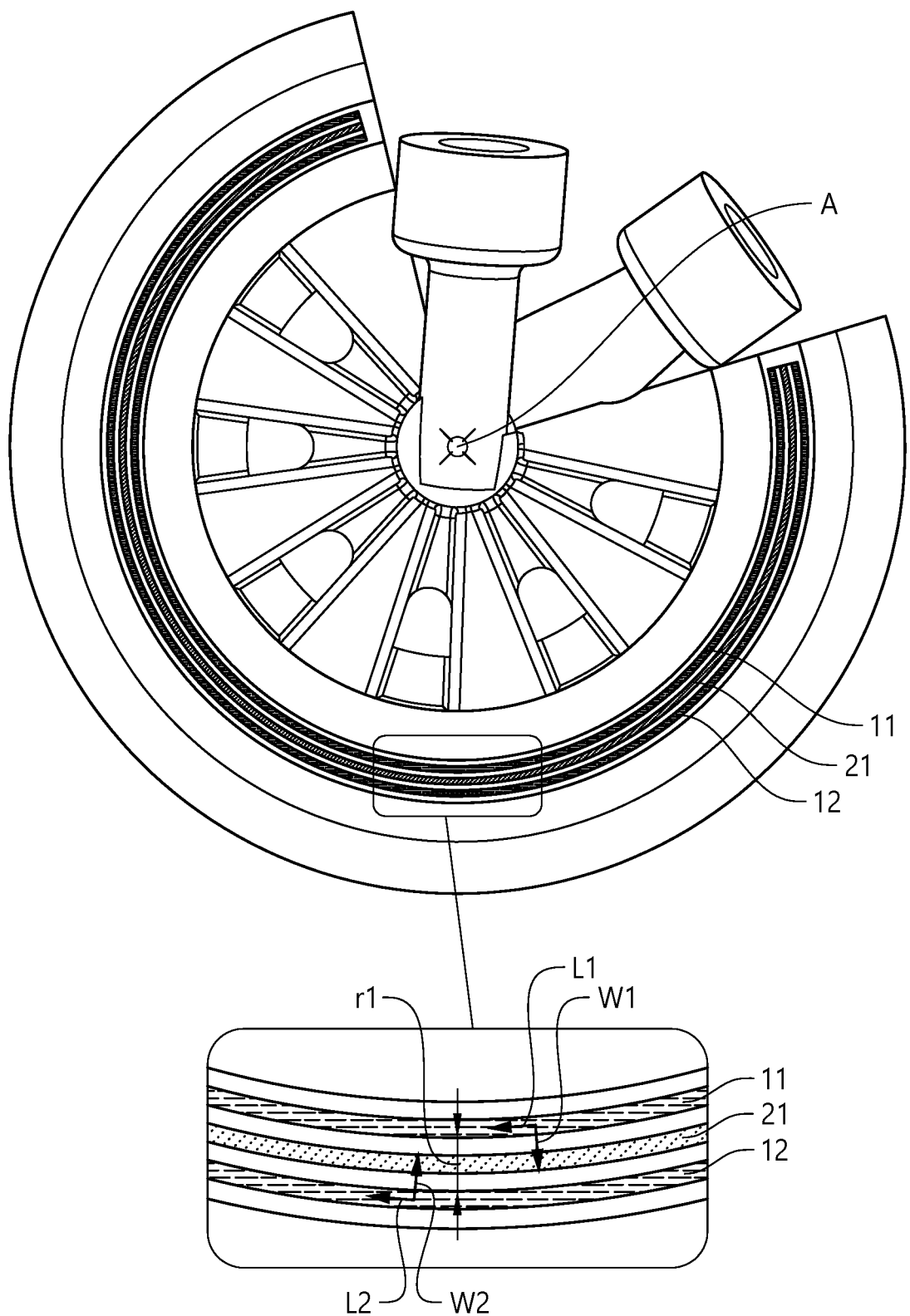
FIG. 5 shows a schematic view from below of a sensor cleaning device according to an embodiment of the present invention.

Each one of the first and second liquid outlets 11, 12 is having a width and a length, wherein the length extends in a length direction L1, L2 and the width extends in a width direction w1, w2, wherein the length direction is perpendicular to the width direction, and wherein the first and second liquid outlets 11, 12 are configured so that pressurized liquid is emitted transversely through a sectional plane defined by the width direction w1, w2 and the length direction L1, L2. The length directions L1, L2, as shown, may extend in the circumferential direction of the sensor cleaning device 1 with respect to the center axis A, and the width directions w1, w2 may thereby extend in a radial direction of the sensor cleaning device with respect to the center axis A. A more detailed view of the first and second liquid outlets 11, 12 is shown in FIG. 5, showing a schematic view of the liquid outlets 11, 12, from below, in the direction of the center axis A. Moreover, as shown, the length is greater than the width, for each first and second liquid outlet 11, 12 so that a first and second line-shaped liquid outlet 11, 12 is formed. In the shown embodiment, the line-shaped liquid outlets 11, 12 extend in the circumferential direction with respect to the center axis A. FIG. 5 shows that the two line-shaped liquid outlets 11, 12 extend in a portion of the circumference. It shall be noted that according to different embodiments of the present invention, the extension of the two outlets 11, 12 may correspond to 10-360 degrees of the complete circumference, such as 10-330 degrees, 10-300 degrees, 20-360 degrees, 20-330 degrees, 20-300 degrees, 30-360 degrees, 30-330 degrees or 30-300 degrees of the complete circumference. More specifically, the liquid outlets 11, 12 should preferably extend above at least a portion of an outer peripheral surface 31 of the external vehicle sensor device 30 where it has its field of view or the like. Thereby this portion of the outer peripheral surface 31 can be efficiently cleaned.

As can be further seen in e.g. FIG. 5, the first and second line-shaped liquid outlets 11, 12 may be offset with respect to each other by a radial distance r1. It shall be noted that the radial distance r1 in FIG. 5 may be exaggerated, and in a preferred embodiment the first and second line-shaped liquid outlets 11, 12 are provided proximate each other with only a small offset, e.g. a small radial offset. The radial distance r1 may be provided in a sectional plane which is perpendicular to the center axis A.

Moreover, the first and second line-shaped liquid outlets 11, 12 are further configured so that emitted pressurized liquid therefrom during use impinge each other, thereby forming a resulting sheet of liquid LS. The resulting sheet of liquid LS is preferably directed towards the outer peripheral surface 31 of the external vehicle sensor device 30. In the shown embodiments, the resulting sheet of liquid LS is directed radially inwardly and downwardly towards the center axis A to thereby clean the outer peripheral surface 31 from a top portion to the bottom.

Figure 3:
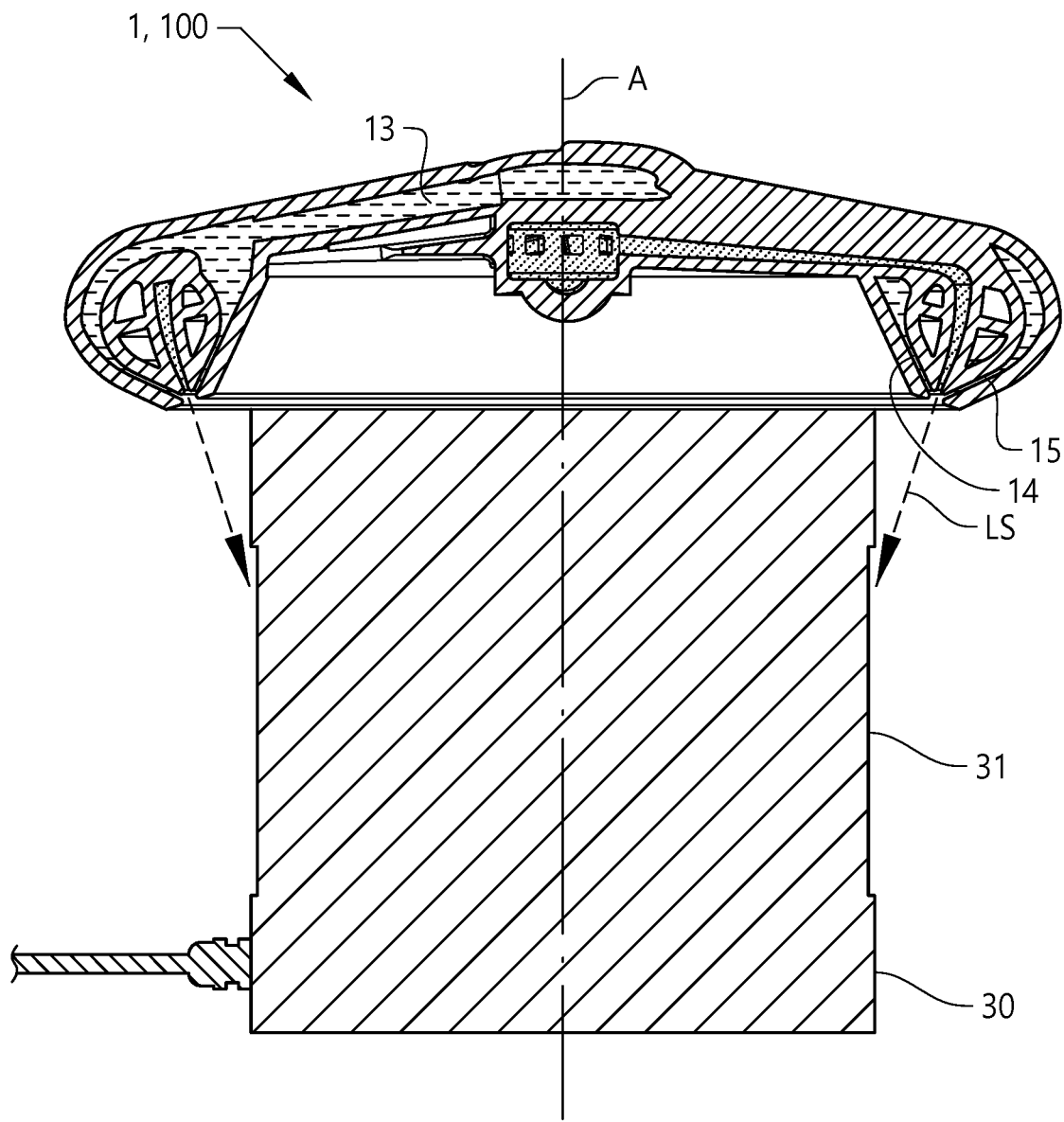
FIG. 3 shows a sectional view of a sensor cleaning device and an external vehicle sensor assembly according to embodiments of the present invention.
Figure 4A:
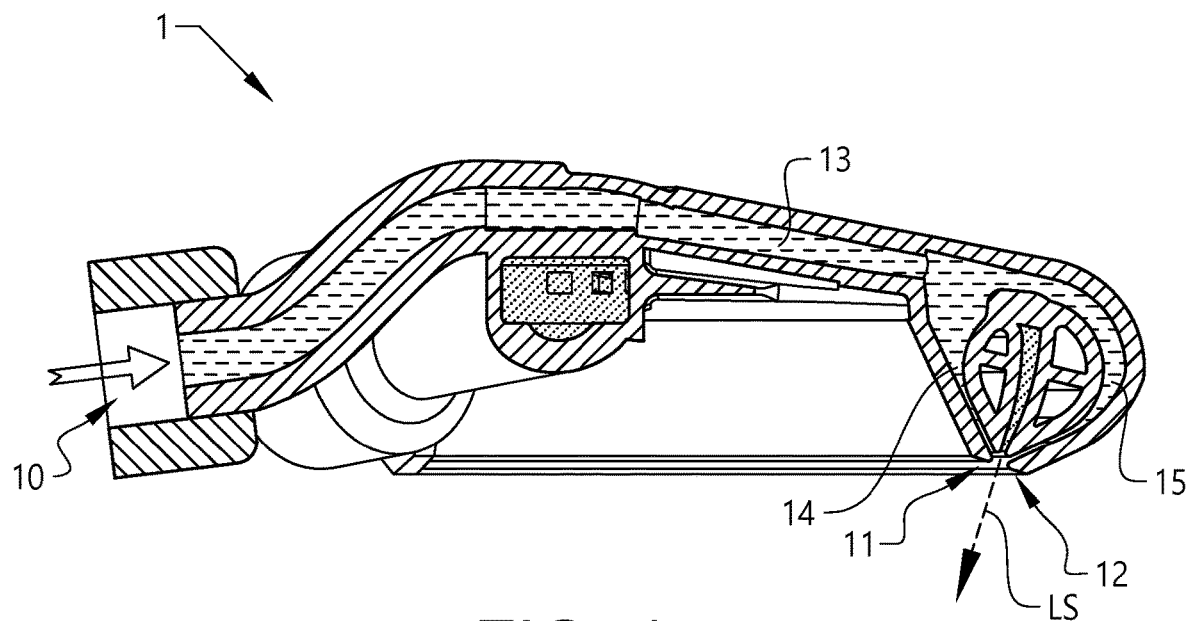
FIGS. 4a and 4b show two sectional views of a sensor cleaning device according to embodiments of the present invention.

As further shown in e.g. FIGS. 3 and 4a, the first and second line-shaped liquid outlets 11, 12 may further be configured so that during use outlet flow directions of emitted pressurized liquid from each one of the first and second line-shaped liquid outlets 11, 12 are angled relative each other at an angle of 30-120 degrees, such as 50-110, 80-100 or 85-95 degrees. In the shown embodiment the angle is approximately 90 degrees, which has been found to provide a reliable sheet of liquid LS.

Further, as shown in e.g. FIG. 5, each one of the first and second line-shaped liquid outlets 11, 12 may extend in its length direction L1, L2 so that a continuous uninterrupted liquid outlet is formed.

The first and second line-shaped liquid outlets 11, 12 as shown are further provided parallel with respect to their length directions, L1, L2.

Each one of the first and second line-shaped liquid outlets 11, 12 may have a curvature shape with a radius extending from the center axis A of the sensor cleaning device 1 to the respective first and second line-shaped liquid outlets 11, 12. The curvature shape is in the shown embodiments an annular shape, and more specifically a circular shape, as shown in e.g. FIG. 5.

Figure 6:
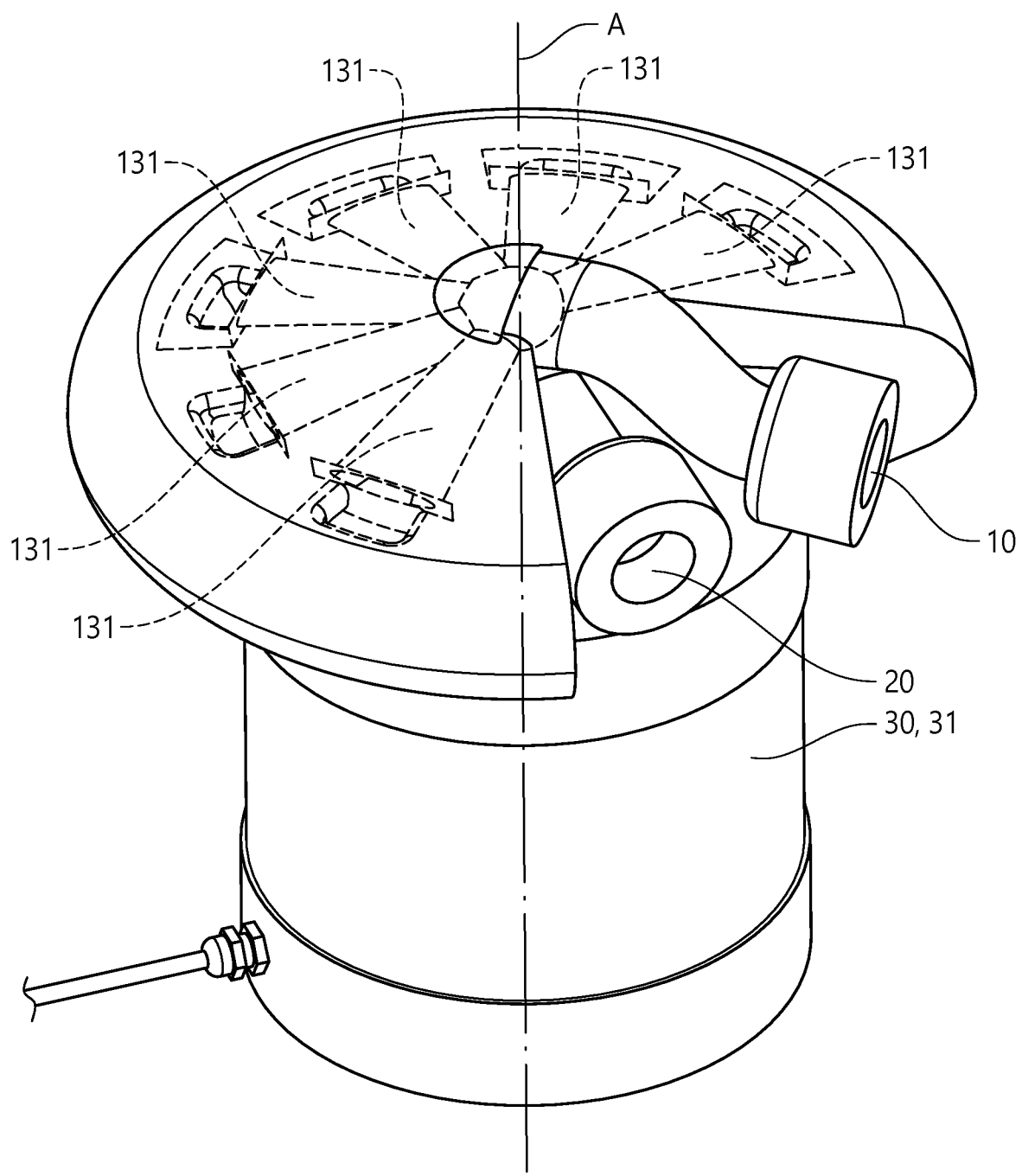
FIG. 6 shows a perspective and partly transparent view of a sensor cleaning device and an external vehicle sensor assembly according to embodiments of the present invention.

With respect to FIG. 6, which shows a transparent perspective view of the sensor cleaning device 1, it can be seen that the sensor cleaning device 1 may be formed so that the chamber 13 comprises one or more separate channels 131 formed as respective radially extending arms extending from a center region of the sensor cleaning device to the first and second line-shaped liquid outlets 11, 12. The center region is a region in which the center axis A is provided.

Figure 4B:
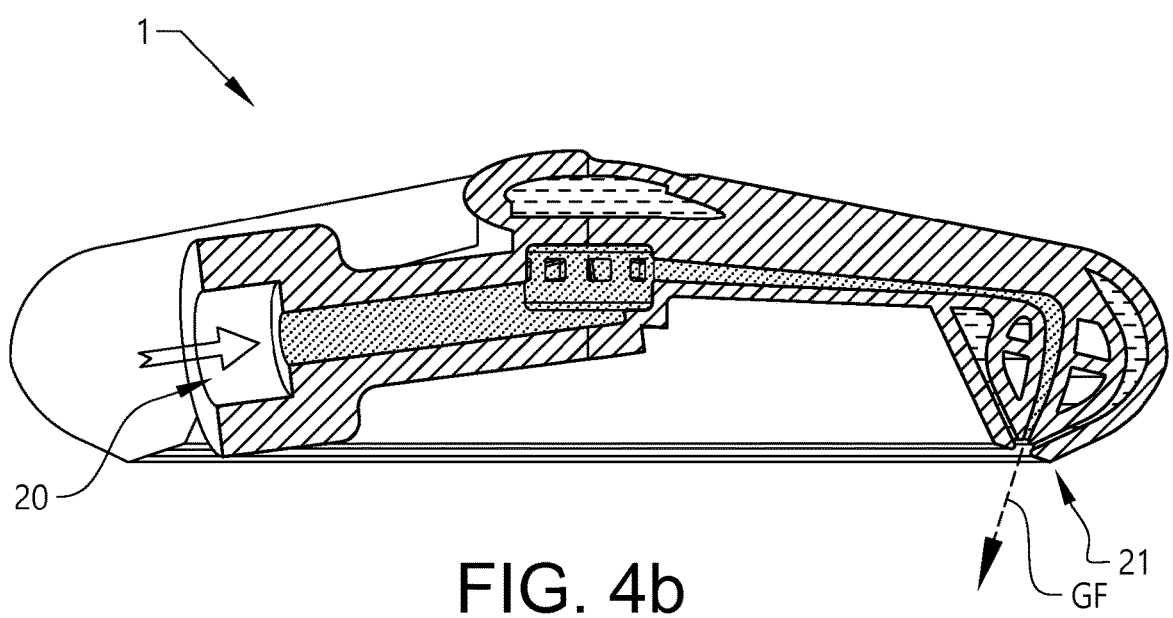

The sensor cleaning device 1 as shown in e.g. FIGS. 4b and 5 further comprises a gas inlet 20 for receiving pressurized gas and at least one gas outlet 21 for emitting pressurized gas which is received from the gas inlet 20. As shown, the at least one gas outlet 21 may be provided in-between the first and second line-shaped liquid outlets 11, 12. Further, as shown, the at least one gas outlet 21 may have a width and a length, wherein the length extends in a length direction and the width extends in a width direction. The length direction is perpendicular to the width direction, similar to the configuration of the line-shaped liquid outlets 11, 12. Further, the at least one gas outlet 21 is configured so that pressurized gas is emitted transversely through a sectional plane defined by the width direction and the length direction, and wherein the length is greater than the width so that a line-shaped gas outlet is formed. In the shown embodiments, the length direction of the at least one line-shaped gas outlet 21 is provided parallel with respect to the length direction of the first and second line-shaped liquid outlets 11, 12. The sensor cleaning device 1 may further comprise a valve (not shown) for opening and closing fluid communication from an external source of pressurized gas to the gas inlet 20. The valve is preferably located close to the gas inlet 20 and close to the gas outlet 21 in order to prevent any time-lag from opening the valve until gas is emitted from the gas outlet 21. As previously mentioned, the gas is preferably pressurized air. The gas outlet 21 provides a flow of gas GF which is preferably directed towards the outer peripheral surface 31, as shown in e.g. FIG. 4*b*.

As further shown in the embodiments, the first line-shaped liquid outlet 11 may be provided closer to the center axis A of the sensor cleaning device 1 than the second line-shaped liquid outlet 12, wherein a first volume 14 of the chamber 13, which is fluidly connected to and provided proximate the first line-shaped liquid outlet 11, is smaller than a second volume 15 of the chamber 13 which is fluidly connected to and provided proximate the second line-shaped liquid outlet 12.

Further, as shown, the first line-shaped liquid outlet 11 may be configured so that during use an outlet flow direction of emitted pressurized liquid therefrom is directed away from the outer peripheral surface 31 of the external vehicle sensor device 30, and the second liquid outlet 12 is configured so that during use an outlet flow direction of emitted pressurized liquid therefrom is directed towards the outer peripheral surface 31 of the external vehicle sensor device. This may enable the first line-shaped liquid outlet 11 to initially provide an outwardly directed spray when the first volume 14 is smaller than the second volume 15. Such outwardly directed spray may provide a liquid shield for the external vehicle sensor device 30 and may for example be used when meeting other vehicles, whereby the liquid shield may protect the external vehicle sensor device 30 from dirt coming from the meeting vehicle.

Similar to the above mentioned valve for the gas, the sensor cleaning device 1 may further comprise a valve (not shown) for opening and closing fluid communication from an external source of pressurized liquid to the liquid inlet 10. Such valve may also preferably be located close to the liquid inlet 10 and the liquid outlets 11, 12, in order to prevent any time-lag from opening the valve until liquid is emitted from the liquid outlets 11, 12.

In the shown embodiments, the sensor cleaning device 1 is provided as a separate component which is connected to the external vehicle sensor device 30. As can be seen, the sensor cleaning device 1 is provided above the external vehicle sensor device 30, as seen when mounted to the vehicle 2. Thereby, the sensor cleaning device 1 can clean the outer peripheral surface 31 of the external vehicle sensor device 30 from a top portion to bottom thereof.

Figure 7:
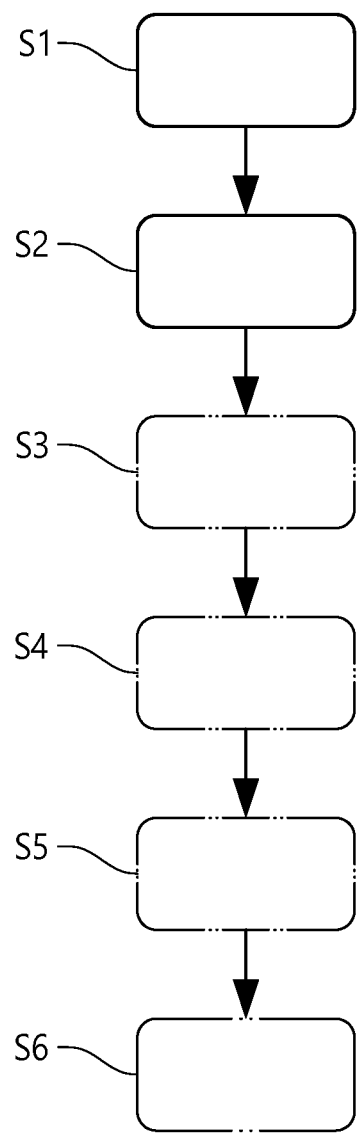
FIG. 7 shows a flowchart of a method according to an example embodiment of the present invention.

FIG. 7 shows a flowchart of a method for cleaning an external vehicle sensor device 30 from above by use of a sensor cleaning device 1 according to any one of the embodiments of the first aspect of the invention. The method comprises the following steps:

S1: providing pressurized liquid to the liquid inlet 10 for a period of time so that the resulting sheet of liquid cleans an outer peripheral surface 31 of the external vehicle sensor device 1, preferably by opening the aforementioned valve for the liquid inlet, S2: stopping the providing of pressurized liquid to the liquid inlet 10 when the period of time has lapsed, preferably by closing the valve.

The method may further comprise an optional step S3, indicated by the box S3 with dashed lines in FIG. 7, of providing pressurized gas to the gas inlet 20 subsequent to stopping the providing of pressurized liquid to the liquid inlet 10, preferably by opening the valve for the gas inlet.

The method may further comprise yet another optional step S4 of simultaneously providing pressurized gas to the gas inlet 20 and pressurized liquid to the liquid inlet 10. Thereby a different type of resulting flow different than the sheet of fluid LS may be generated. As previously mentioned, this may be used for removing dirt etc. which could not be removed by use of the resulting sheet of liquid LS.

Still further, the method may further comprise a step S5 of identifying when an external moving object is passing by the external vehicle sensor device 30, and in response thereto, a following step of providing S6 pressurized liquid to the liquid inlet 10 for a predetermined period of time.

The steps S1, S2 and S3 are preferably performed in consecutive order. The same applies to the steps S5 and S6, whilst the step S4 may be performed in any order and at any time irrespective of the other steps. Boxes with dashed lines in FIG. 7 indicate that the step is optional.

It is to be understood that the present invention is not limited to the embodiments described above and illustrated in the drawings; rather, the skilled person will recognize that many changes and modifications may be made within the scope of the appended claims.

The invention claimed is:

1. A sensor cleaning device for cleaning an external vehicle sensor device from above, the sensor cleaning device comprising,
    a liquid inlet for receiving pressurized liquid,
    a first and a second liquid outlet for emitting pressurized liquid which is received from the liquid inlet,
    a chamber for pressurized liquid fluidly connecting the liquid inlet and the first and second liquid outlets,
    wherein each one of the first and second liquid outlets is having a width and a length, wherein the length extends in a length direction and the width extends in a width direction, wherein the length direction is perpendicular to the width direction, and wherein the first and second liquid outlets are configured so that pressurized liquid is emitted transversely through a sectional plane defined by the width direction and the length direction, characterized in that, the length is greater than the width for each first and second liquid outlet so that a first and second line-shaped liquid outlet is formed, the chamber having a first volume fluidly connected to the first line-shaped liquid outlet and a second volume fluidly connected to the second line-shaped liquid outlet, wherein the first and second volumes extend in a circumferential direction to form a tubular structure providing dual channel flow of the pressurized liquid, the first and second line-shaped liquid outlets are further configured so that emitted pressurized liquid therefrom during use impinge each other, thereby forming a resulting sheet of liquid, a gas inlet for receiving pressurized gas and at least one gas outlet for emitting pressurized gas which is received from the gas inlet,
wherein the at least one gas outlet is provided in-between the first and second line-shaped liquid outlets.

2. The sensor cleaning device according to claim 1, wherein the first and second line-shaped liquid outlets are further configured so that during use outlet flow directions of emitted pressurized liquid are angled relative each other at an angle of 30-120 degrees.

3. The sensor cleaning device according to claim 1, wherein each one of the first and second line-shaped liquid outlets is extending in its length direction so that a continuous uninterrupted liquid outlet is formed.

4. The sensor cleaning device according to claim 1, wherein the first and second line-shaped liquid outlets are further provided parallel with respect to their length directions.

5. The sensor cleaning device according to claim 1, wherein each one of the first and second line-shaped liquid outlets is having a curvature shape with a radius extending from a center axis of the sensor cleaning device to the respective first and second line-shaped liquid outlet.

6. The sensor cleaning device according to claim 1, wherein the sensor cleaning device is formed so that the chamber comprises one or more separate channels formed as respective radially extending arms extending from a center region of the sensor cleaning device to the first and second line-shaped liquid outlets.

7. The sensor cleaning device according to claim 1, wherein the at least one gas outlet is having a width and a length, wherein the length extends in a length direction and the width extends in a width direction, wherein the length direction is perpendicular to the width direction, and wherein the at least one gas outlet is configured so that pressurized gas is emitted transversely through a sectional plane defined by the width direction and the length direction, and wherein the length is greater than the width so that a line-shaped gas outlet is formed.

8. The sensor cleaning device according to claim 7, wherein the length direction of the at least one line-shaped gas outlet is provided parallel with respect to the length direction of at least one of the first and second line-shaped liquid outlets.

9. The sensor cleaning device according to claim 1, further comprising a valve for opening and closing fluid communication from an external source of pressurized gas to the gas inlet.

10. The sensor cleaning device according to claim 1, wherein the first line-shaped liquid outlet is provided closer to a center axis of the sensor cleaning device than the second line-shaped liquid outlet, wherein a first volume of the chamber, which is fluidly connected to and provided proximate the first line-shaped liquid outlet, is smaller than a second volume of the chamber which is fluidly connected to and provided proximate the second line-shaped liquid outlet.

11. The sensor cleaning device according to claim 1, further comprising a valve for opening and closing fluid communication from an external source of pressurized liquid to the liquid inlet.

12. An external vehicle sensor assembly comprising a sensor cleaning device according to claim 1 and an external vehicle sensor device.

13. The external vehicle sensor assembly according to claim 12, wherein the sensor cleaning device is provided as a separate component connected to the external vehicle sensor device.

14. The external vehicle sensor assembly according to claim 12, wherein the sensor cleaning device is provided above the external vehicle sensor device so that the sensor cleaning device can clean an outer peripheral surface of the external vehicle sensor device from a top portion to a bottom thereof, as seen when the external vehicle sensor assembly is mounted to a vehicle.

15. The external vehicle sensor assembly according to claim 12, wherein the first and second liquid outlets are further configured so that the resulting sheet of liquid is directed towards an outer peripheral surface of the external vehicle sensor.

16. The external vehicle sensor assembly according to claim 12, wherein the first line-shaped liquid outlet is configured so that during use an outlet flow direction of emitted pressurized liquid therefrom is directed away from the outer peripheral surface of the external vehicle sensor device, and the second liquid outlet is configured so that during use an outlet flow direction of emitted pressurized liquid therefrom is directed towards the outer peripheral surface of the external vehicle sensor device.

17. A vehicle comprising the sensor cleaning device according to claim 1.

18. A method for cleaning an external vehicle sensor device from above by use of a sensor cleaning device according to claim 1, the method comprising: providing pressurized liquid to the liquid inlet for a period of time so that the resulting sheet of liquid cleans an outer peripheral surface of the external vehicle sensor device by opening a valve, stopping the providing of pressurized liquid to the liquid inlet when the period of time has lapsed by closing the valve.

19. The method according to claim 18, wherein the period of time is a predetermined period of time.

20. The method according to claim 18, wherein further comprising a step of providing pressurized gas to the gas inlet subsequent to stopping the providing of pressurized liquid to the liquid inlet.

21. The method according to claim 18, further comprising a step of simultaneously providing pressurized gas to the gas inlet and pressurized liquid to the liquid inlet.

22. The method according to claim 18, further comprising steps of identifying when an external moving object is passing by the external vehicle sensor device, and in response thereto, providing pressurized liquid to the liquid inlet for a predetermined period of time.

* * * * *